H. B. RORKE.
Sharpening-Machines.
No. 146,098. Patented Dec. 30, 1873.
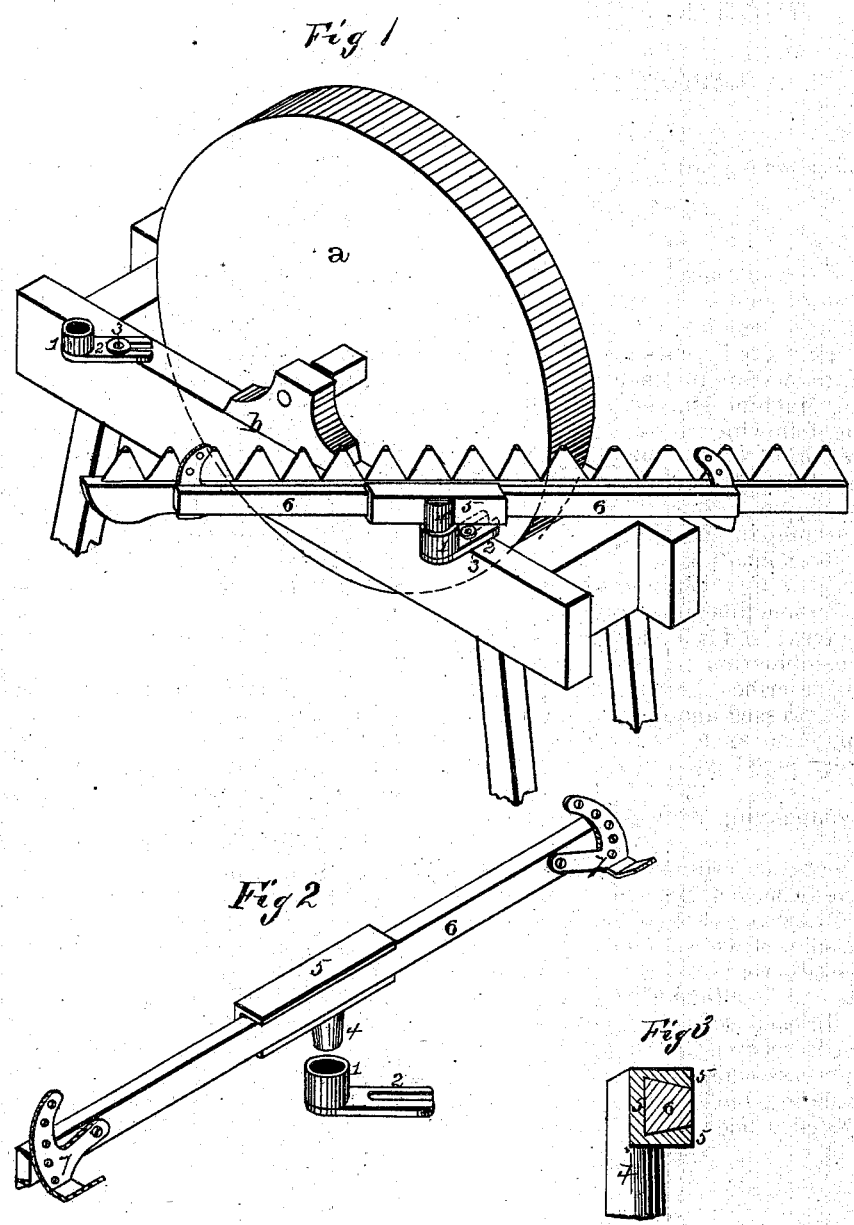

UNITED STATES PATENT OFFICE.

HUGH B. RORKE, OF CAZENOVIA, NEW YORK.

IMPROVEMENT IN SHARPENING-MACHINES.

Specification forming part of Letters Patent No. 146,098, dated December 30, 1873; application filed October 28, 1873.

*To all whom it may concern:*

Be it known that I, HUGH B. RORKE, of Cazenovia, in the county of Madison and State of New York, have invented certain new and useful Improvements in Machines for Grinding Mowing-Machine Knives; and I do hereby declare the following to be a full, clear, and exact description of the invention, such as will enable others skilled in the art to which it pertains to make and use it, reference being had to the accompanying drawings, which form part of this specification.

The nature of my invention relates to an improvement in machines for grinding mowing-machine knives; and it consists in the arrangement and combination of parts, which will be more fully described hereafter, whereby the knife can be pressed against the stone at any desired angle, so as to rapidly sharpen the teeth at very little expenditure of time and labor.

The accompanying drawings represent my invention.

*a* represents an ordinary grindstone, journaled in the frame *b* in the usual manner. At each end of the frame there is attached a socket, 1, from the sides of which extend a slotted arm, 2, which passes around the set-screws 3, so that the sockets can be adjusted back and forth at pleasure. In each socket is placed the pivot 4, to which is secured the holder 5, having a dovetailed recess made in its inner side, to receive the sliding bar 6. To each end of this bar is pivoted a hook, 7, for supporting the knife being ground, and which have a graduated series of holes made through them, so that they can be regulated up or down, so as to raise or lower the knife to suit the angle required. By means of the dovetail in the holder the bar 6 can be moved along, so as to present one tooth after the other to the stone, and yet be securely held in place. By moving the sockets in or out from the stone, the bevel or angle at which the teeth are to be ground is readily regulated. When one side of the teeth have been finished the holder is transferred to the other socket, and the other side ground.

Having thus described my invention, I claim—

1. In combination with the pivoted holder 5, the socket 1, having the forked arm 2, cast with it in a single piece, and which can be adjusted back and forth, and swung around from side to side, substantially as set forth.

2. The adjustable hooks 7, in combination with a bar, 6, for holding the knife, substantially as specified.

3. The combination of the adjustable socket 1, pivot 4, dovetailed holder 5, bar 6, and hooks 7, with the grindstone *a*, substantially as shown and described.

In testimony that I claim the foregoing I have hereunto set my hand.

HUGH B. RORKE.

Witnesses:
SAML. I. ANDERSON,
EZEKIEL P. MORE.